US012300933B2

(12) United States Patent
K T et al.

(10) Patent No.: US 12,300,933 B2
(45) Date of Patent: May 13, 2025

(54) ELECTRICAL CONNECTOR WITH A COVER STRUCTURE AS WELL AS A MATING CONNECTOR AND A CONNECTOR ASSEMBLY

(71) Applicant: TE Connectivity India Private Limited, Bangalore (IN)

(72) Inventors: Gopi K T, Bangalore (IN); Hariharan Iyer Karthik, Bangalore (IN)

(73) Assignee: TE Connectivity India Private Limited, Bangalore (IN)

( * ) Notice: Subject to any disclaimer, the term of this patent is extended or adjusted under 35 U.S.C. 154(b) by 530 days.

(21) Appl. No.: 17/671,760

(22) Filed: Feb. 15, 2022

(65) Prior Publication Data

US 2022/0263271 A1 Aug. 18, 2022

(30) Foreign Application Priority Data

Feb. 15, 2021 (IN) ............................ 202141006230

(51) Int. Cl.
*H01R 13/64* (2006.01)
*H01R 13/453* (2006.01)
(Continued)

(52) U.S. Cl.
CPC .......... *H01R 13/64* (2013.01); *H01R 13/453* (2013.01); *H01R 13/4538* (2013.01);
(Continued)

(58) Field of Classification Search
CPC .. H01R 13/64; H01R 13/453; H01R 13/4538; H01R 13/502; H01R 13/516;
(Continued)

(56) References Cited

U.S. PATENT DOCUMENTS 8,075,325 B1 12/2011 Kao et al.
9,070,995 B2 6/2015 Yagome et al.
(Continued)

FOREIGN PATENT DOCUMENTS

EP 2642606 A1 9/2013
JP 2011258414 A 12/2011
(Continued)

OTHER PUBLICATIONS

Korean Office Action dated Dec. 5, 2023, corresponding to Application No. 10-2022-0019114, 6 pages.
(Continued)

*Primary Examiner* — Justin M Kratt
(74) *Attorney, Agent, or Firm* — Barley Snyder

(57) ABSTRACT

An electrical connector comprises at least one contact element, and a cover structure restricting access to the at least one contact element. The cover structure includes a wall element at least partially surrounding the at least one contact element and defines a reception zone between the wall element and the at least one contact element. The wall element includes at least one deflectable latch member. A cover element is movable within the reception zone along a retraction direction from a secured position to a retracted position. The at least one contact element is enclosed by the cover element in the secured position. The at least one deflectable latch member secures the cover element in the secured position.

18 Claims, 6 Drawing Sheets

(51) Int. Cl.

| | |
|---|---|
| ***H01R 13/502*** | (2006.01) |
| ***H01R 13/516*** | (2006.01) |
| ***H01R 13/518*** | (2006.01) |
| ***H01R 13/53*** | (2006.01) |
| ***H01R 13/627*** | (2006.01) |
| *H01R 13/44* | (2006.01) |
| *H01R 13/447* | (2006.01) |
| *H01R 13/506* | (2006.01) |
| *H01R 13/52* | (2006.01) |
| *H01R 13/641* | (2006.01) |
| *H01R 13/645* | (2006.01) |

(52) U.S. Cl.

CPC ......... *H01R 13/502* (2013.01); *H01R 13/516* (2013.01); *H01R 13/518* (2013.01); *H01R 13/53* (2013.01); *H01R 13/6271* (2013.01); *H01R 13/6272* (2013.01); *H01R 13/44* (2013.01); *H01R 13/447* (2013.01); *H01R 13/5025* (2013.01); *H01R 13/506* (2013.01); *H01R 13/5202* (2013.01); *H01R 13/5213* (2013.01); *H01R 13/627* (2013.01); *H01R 13/641* (2013.01); *H01R 13/645* (2013.01)

(58) Field of Classification Search

CPC .. H01R 13/518; H01R 13/53; H01R 13/6271; H01R 13/6272; H01R 13/44; H01R 13/447; H01R 13/5025; H01R 13/506; H01R 13/5202; H01R 13/5213; H01R 13/627; H01R 13/641; H01R 13/645

See application file for complete search history.

(56) References Cited

U.S. PATENT DOCUMENTS

| | | | |
|---|---|---|---|
| 9,774,125 | B2 | 9/2017 | Furuya et al. |
| 2013/0237074 | A1 | 9/2013 | Yagome et al. |
| 2017/0025787 | A1 | 1/2017 | Choi et al. |
| 2017/0117660 | A1 | 4/2017 | Furuya et al. |
| 2020/0366028 | A1 | 11/2020 | Krucinski et al. |

FOREIGN PATENT DOCUMENTS

| | | | | | |
|---|---|---|---|---|---|
| JP | 2012109118 | A | | 6/2012 | |
| JP | 2014203774 | A | * | 10/2014 | ......... H01R 13/5219 |
| JP | 6521066 | B2 | | 5/2019 | |
| WO | 0046881 | A1 | | 8/2000 | |
| WO | 2014150568 | A1 | | 9/2014 | |
| WO | 2014167751 | A1 | | 10/2014 | |
| WO | WO-2016203588 | A1 | * | 12/2016 | ........... H01R 13/453 |

OTHER PUBLICATIONS

Office Action from Japan's Patent Office dated Apr. 4, 2023, with English translation thereof, corresponding to Application No. 2022-019175, 13 pages.

Extended European Search Report, Application No. 22156740.7-1201, Dated: Jun. 29, 2022, 10 pages.

Indian Search Report, Application No. 202141006230, Dated: Aug. 24, 2022, 5 pages.

* cited by examiner

ELECTRICAL CONNECTOR WITH A COVER STRUCTURE AS WELL AS A MATING CONNECTOR AND A CONNECTOR ASSEMBLY

CROSS-REFERENCE TO RELATED APPLICATIONS

This application claims the benefit of India Patent Application No. 202141006230 filed on Feb. 15, 2021, the whole disclosure of which is incorporated herein by reference.

FIELD OF THE INVENTION

The present invention relates to an electrical connector and, more particularly, to an electrical connector with a cover structure e.g., for high-voltage and high-amperage applications. Further

BACKGROUND

Electrical connectors are provided for establishing electrical connections, which serve the purpose of transferring electrical energy and/or signals. In the case of energy transfer in particular, a safety risk arises, which needs to be addressed accordingly. For example, before establishing said electrical connections, unintended contact of human fingers and tools with current carrying components of the electrical connectors (e.g., contact elements) needs to be prevented. Simultaneously, the contact elements need to maintain a certain accessibility, since the functionality of electrical connectors mostly relies on mating contacts of mating connectors engaging in electrical contact with the contact elements.

Existing solutions employ finger protection for the contact elements. This finger protection, however, often leaves small gaps for the mating contacts through which particularly small fingers and thin tools can unintendedly reach the contact elements. Gapless finger protection on the other hand often requires additional steps of attachment and/or removal. This renders the mating process cumbersome. Lastly, finger protection, which does not require such additional steps during the mating process often employs delicate cover elements, which exhibit low insulation capability, and is thus not suited for applications with high voltages and high currents.

SUMMARY

According to an embodiment of the present disclosure, an electrical connector comprises at least one contact element, and a cover structure restricting access to the at least one contact element. The cover structure includes a wall element at least partially surrounding the at least one contact element and defines a reception zone between the wall element and the at least one contact element. The wall element includes at least one deflectable latch member. A cover element is movable within the reception zone along a retraction direction from a secured position to a retracted position. The at least one contact element is enclosed by the cover element in the secured position. The at least one deflectable latch member secures the cover element in the secured position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
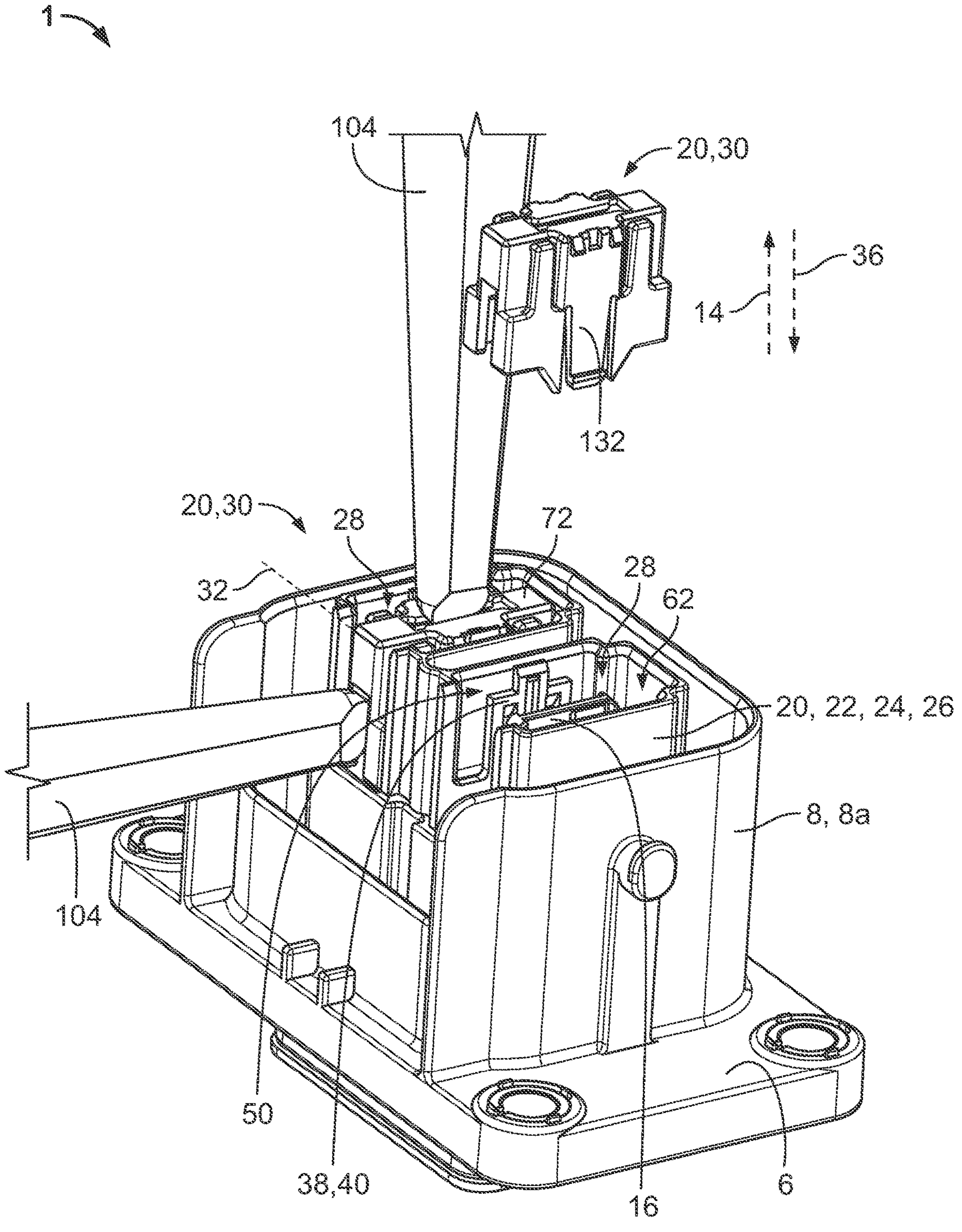
FIG. 1 shows a schematic representation of a partially exploded, perspective view of an electrical connector according to one possible embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 4:
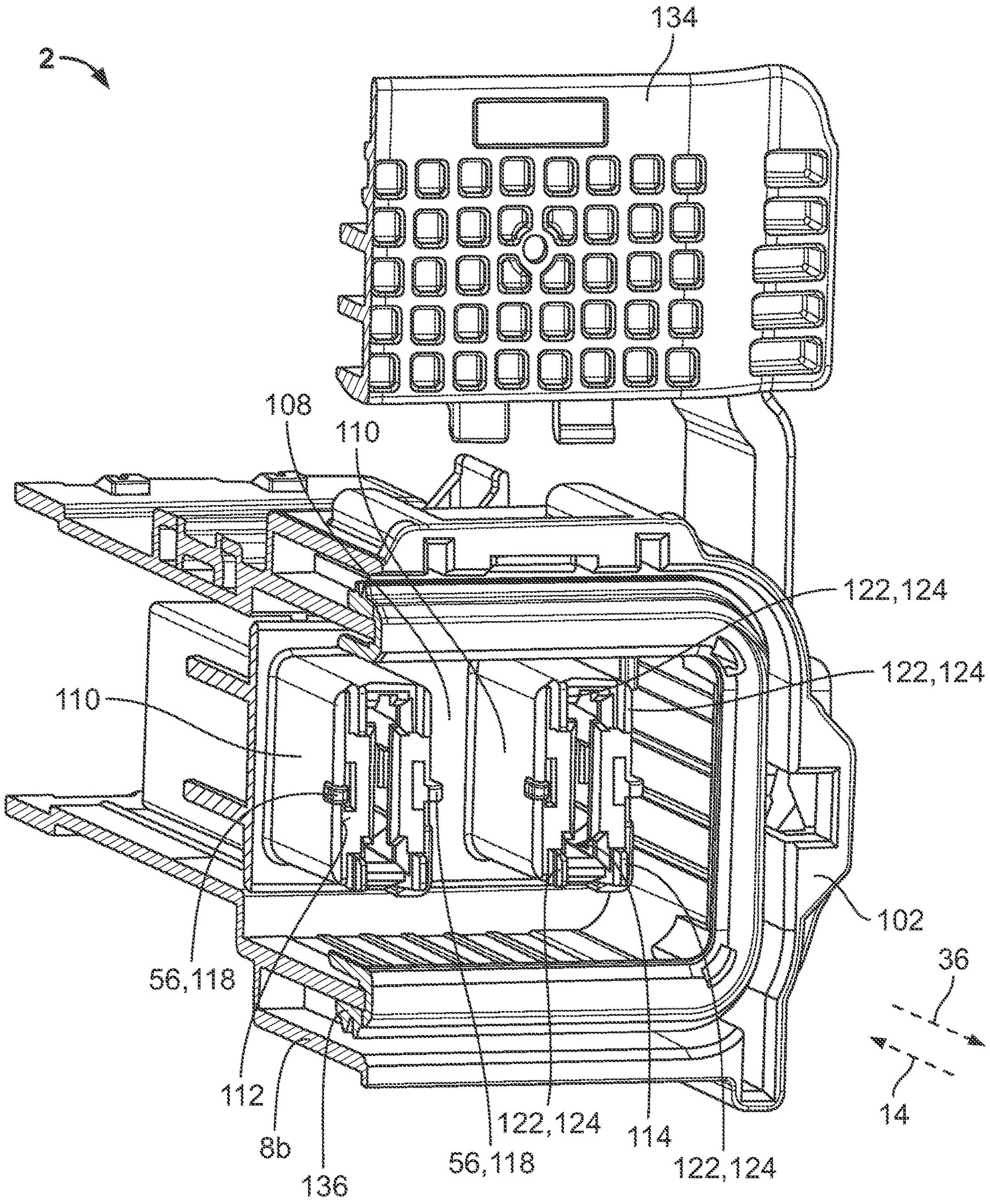
FIG. 4 shows a schematic representation of a sectional view of a mating connector according to one possible embodiment of the present disclosure.
Figure 5:
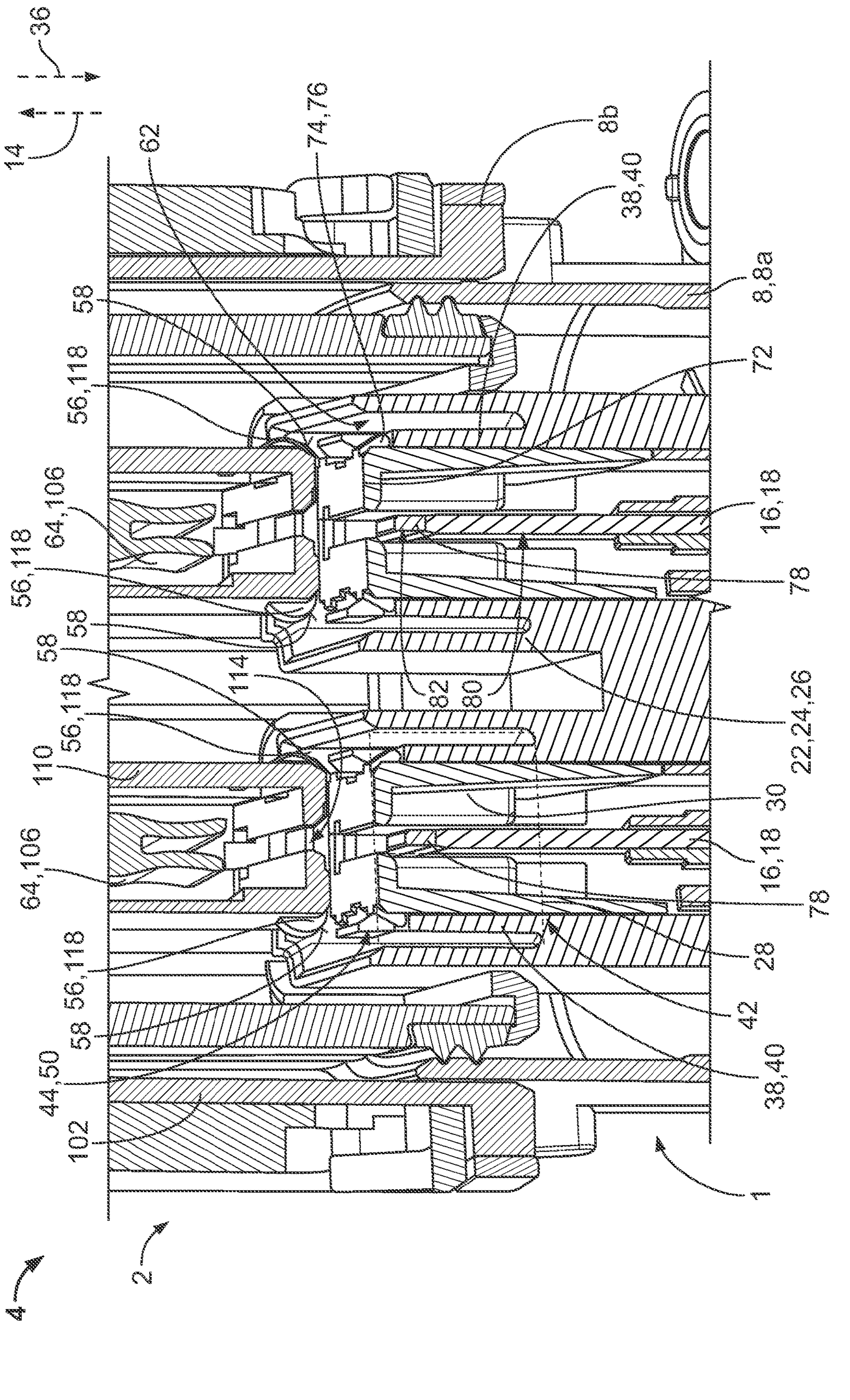
FIG. 5 shows a schematic representation of a detail of a sectional view of a connector assembly according to one possible embodiment of the present disclosure.
Figure 6:
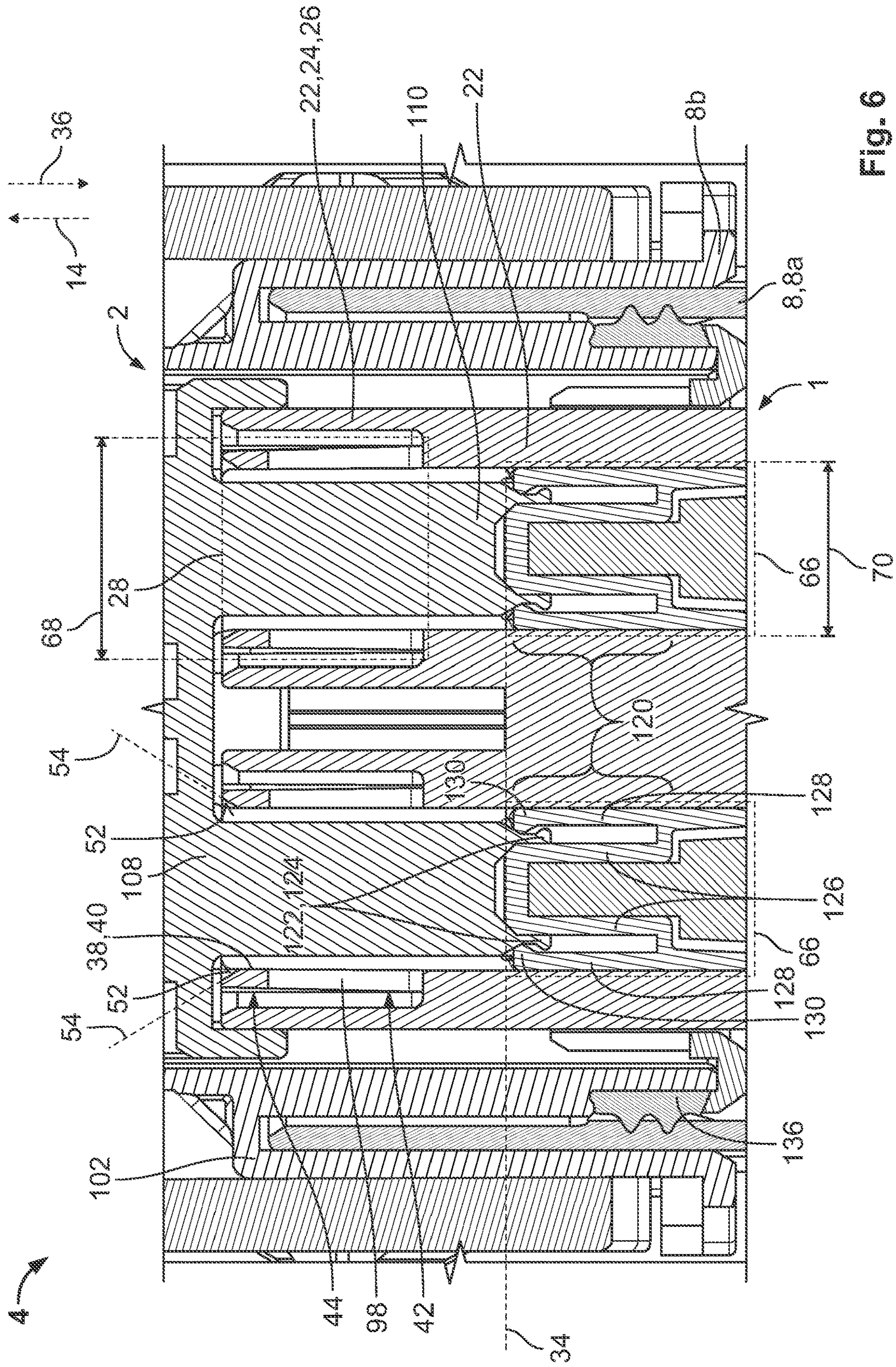
FIG. 6 shows a schematic representation of a detail of a sectional side view of the connector assembly according to the embodiment shown in FIG. 5.

In the following, the structure of an exemplary embodiment of an electrical connector 1 according to the present invention is explained with reference to FIGS. 1-3. FIG. 4 is used for explaining the structure of an exemplary embodiment of a mating connector 2 according to the present invention. Further, FIGS. 5 and 6 are used for explaining the structure and function of a connector assembly 4 according to an exemplary embodiment of the present invention.

Figure 2:
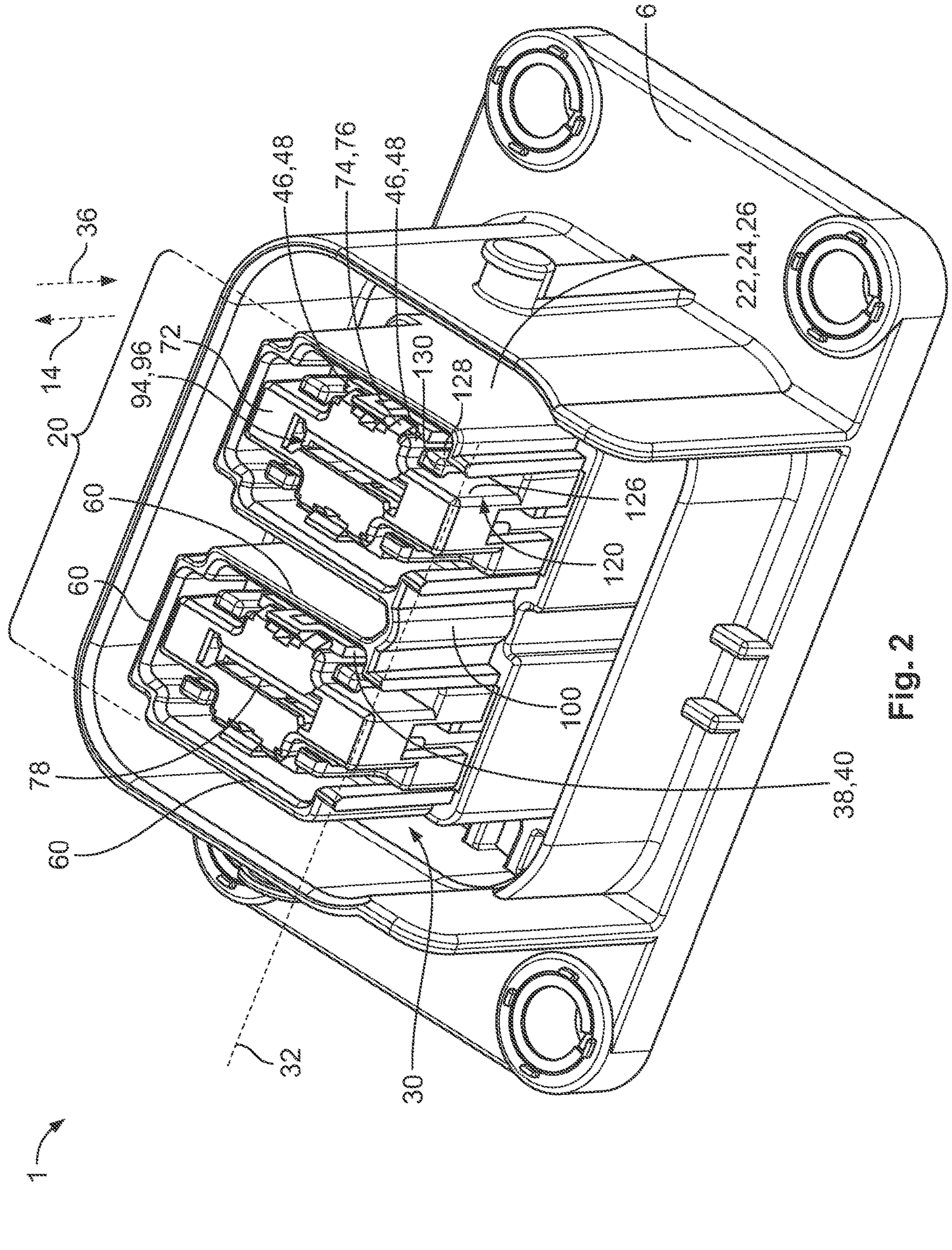
FIG. 2 shows a schematic representation of a perspective view of the electrical connector according to the embodiment shown in FIG. 1.
Figure 3:
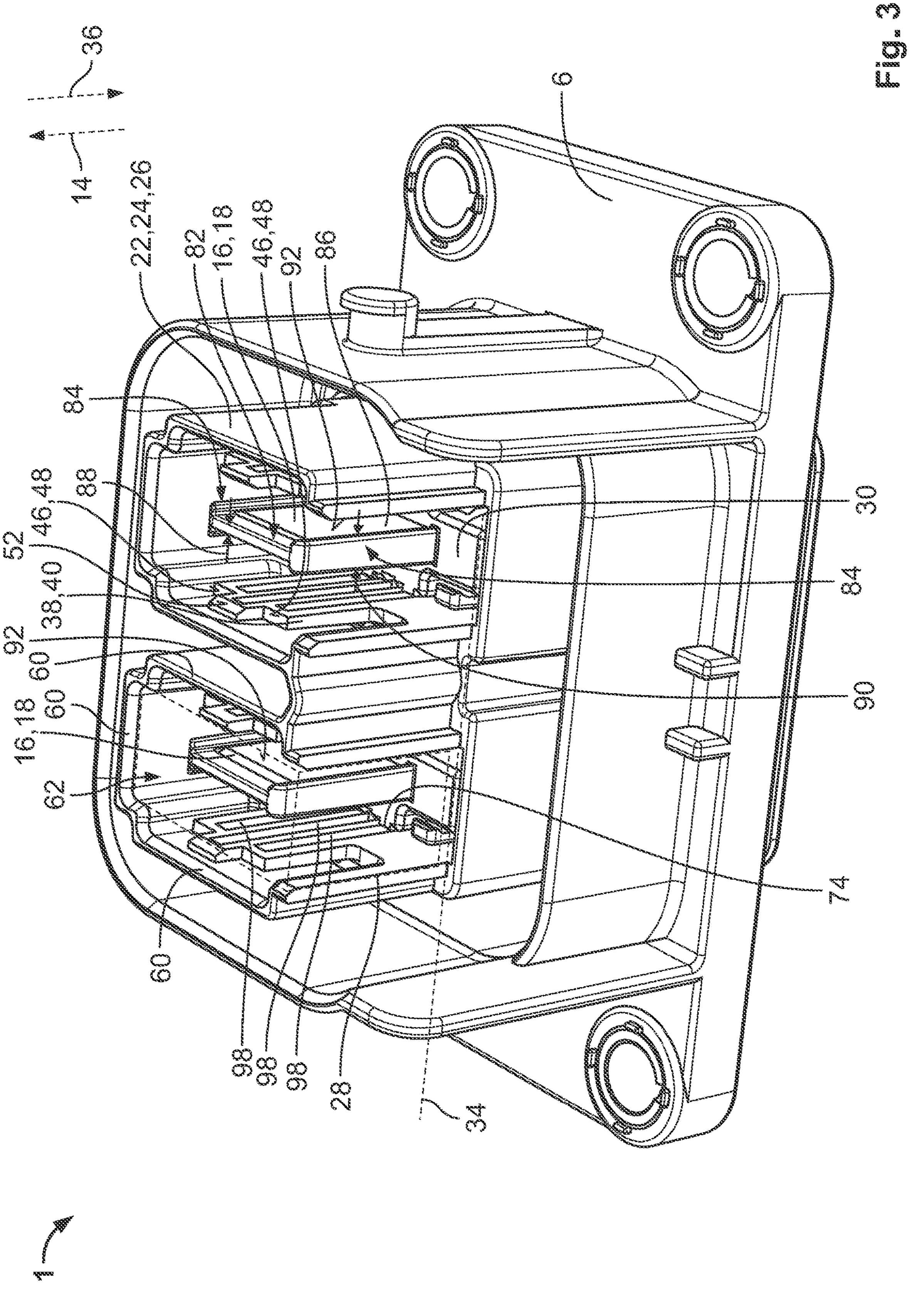
FIG. 3 shows a schematic representation of another perspective view of the electrical connector according to the embodiment shown in FIG. 1.

FIGS. 1-3 show perspective views of the electrical connector 1 according to an exemplary embodiment of the present disclosure. The electrical connector 1 may comprise a connector housing 6 forming a connector face 8. In the shown exemplary embodiment, the connector face 8 is a male connector face 8*a* configured to be inserted into a complementarily formed female connector face 8*b* of the mating connector 2 (see FIG. 4). Alternatively, the connector face 8 of the electrical connector 1 may also be a female connector face adapted to receive a male connector face of the mating connector 2. The male connector face 8*a* and the female connector face 8*b* may be mated along a mating direction 14.

The electrical connector 1 may comprise at least one electrically conductive contact element 16 (see FIG. 3). The at least one contact element 16 may, for example, be a tab-shaped contact 18 pointing in the mating direction 14. Alternatively, the at least one contact element 16 may be pin-shaped, sleeve-shaped, fork-shaped or have any other shape common for electrical contact elements. The at least one contact element 16 may be soldered, crimped, welded and/or connected by any other conventional termination technique to a conductor (not shown) of an electrical cable (not shown) within the connector housing 6.

In the shown exemplary embodiment, the electrical connector 1 comprises two contact elements 16. In particular, the electrical connector 1 comprises two contact elements 16 extending along the mating direction 14 and parallel to each other. The number and/or orientation of contact elements 16, however, may be adapted according to the application of the electrical connector 1.

As shown, the electrical connector 1 further comprises an insulative cover structure 20 for restricting access to the contact elements 16. The cover structure 20 may be embodied by the connector housing 6 or be separately assembled to the connector housing 6. Alternatively, parts of the cover structure 20 may be monolithically connected to the connector housing 6. Other parts may be assembled to the connector housing 6 as separate components.

The cover structure 20 comprises a static wall element 22. The wall element 22, for example, may be monolithically connected to the connector housing 6. In the illustrated exemplary embodiment, the cover structure 20 comprises one wall element 22 for each contact element 16. Each wall element 22 at least partly surrounds the corresponding contact element 16 in a spaced apart manner. In particular, each wall element 22 comprises multiple wall sections 24, which extend parallel to and spaced apart from the corresponding contact element 16. The wall sections 24 of each wall element 22 may be arranged in a closed shape around the corresponding contact element 16. In particular, the wall sections 24 may form a substantially cuboid, box-shaped enclosure 26 around the corresponding contact element 16. Between each wall element 22 and the corresponding contact element 16, a reception zone 28 is defined (see FIG. 3).

The cover structure 20 further comprises a retractable cover element 30. The cover element 30 may be a single-piece component, preferably molded from resin. Alternatively, the cover element 30 may be manufactured by additive manufacturing and/or made from other electrically insulative materials. For each contact element 16, the cover structure 20 preferably comprises one cover element 30.

Each cover element 30 is movable, preferably slidably movable, within the reception zone 28 between the corresponding wall element 22 and contact element 16. In the reception zone 28, each cover element 30 can be moved into a secured position 32 as shown in FIG. 2. Further, each cover element 30 can be moved into a retracted position 34 as shown in FIG. 3. In particular, each cover element 30 is movable from the secured position 32 to the retracted position 34 along a retraction direction 36, the retraction direction 36 preferably being parallel to the mating direction 14. Each cover element 30 is reciprocally movable between the secured position 32 and the retracted position 34.

The respective contact element 16 is enclosed by the corresponding cover element 30 in the secured position 32. In particular, the respective contact element 16 is covered by the corresponding contact element 16 in the retraction direction 36 and optionally in a direction perpendicular to the retraction direction 36. When the corresponding cover element 30 is moved into the retracted position 34, at least part of the contact element 16 is neither enclosed nor covered by the corresponding cover element 30.

For securing the cover element 30 in the secured position 32, the corresponding wall element 22 comprises at least one deflectable latch member 38. In particular, the at least one deflectable latch member 38 selectively hinders the cover element 30 from moving into the retracted position 34, as will be described in further detail below.

The at least one deflectable latch member 38 may be a cantilever flap 40 which has a supported end 42 monolithically connected to one of the wall sections 24 and a free end 44 extending against the retraction direction 36, as can be seen in FIG. 5. Alternatively, the supported end 42 may also be connected via a hinge (not shown) to the corresponding wall section 24.

It is to be understood that the term "deflectable" refers to a property of the at least one latch member 38 according to which the at least one latch member 38 is more elastic, more flexible, more resilient and/or more pliable than the rest of the wall element 22. In other words, a deflection of the at least one latch member 38 requires less force than a comparable deflection of any other part of the wall element 22. Optionally, the at least one latch member 38 may also exhibit a higher elasticity, flexibility, resiliency and/or pliability than any part of the cover element 30.

Further, the wall element 22 may comprise at least two latch members 38 which are arranged opposite to each other with respect to the corresponding contact element 16. In the illustrated exemplary embodiment of FIGS. 1 to 3, each wall element 22 has a pair of such latch members 38. Each latch member 38 comprises at least one blocking surface 46, which faces against the retraction direction 36 and serves as an abutting surface 48 for the corresponding cover element 30. The at least one blocking surface 46 is preferably formed on an edge 50 of the free end 44 of the corresponding latch member 38 embodied by the cantilever flap 40.

Each latch member 38 may further comprise at least one bevel surface 52, which extends obliquely with respect to the retraction direction 36. The at least one bevel surface 52 may also be formed preferably on the edge 50 of the free end 44 of the corresponding latch member 38 embodied by the cantilever flap 40. Each bevel surface 52 functions as a lead-in chamfer 54 for the mating connector 2 (see FIG. 6).

As will be described with reference to FIG. 4 in further detail below, the mating connector 2 may comprise at least one deflection element 56 with an inverse surface 58, which is positioned and oriented in such a way to engage with the at least one bevel surface 52, when the electrical connector 1 and the mating connector 2 are mated. In particular, said engagement causes the corresponding latch member 38, which the at least one bevel surface 52 is a part of, to be deflected.

As can be seen in FIG. 3, outer edges 60 of each wall element 22 may define an access opening 62 leading into the reception zone 28. In particular, when the cover element 30 is in the retracted position 34, a mating contact 64 of the mating connector 2 can be inserted into the corresponding reception zone 28 through the respective access opening 62. In other words, the access opening 62 is open in the mating direction 14, when the corresponding cover element 30 is in the retracted position 34. Especially, the respective reception zone 28, and consequently the corresponding access opening 62 is vacated by the corresponding cover element 30 in the retracted position 34. Each cover element 30 in the retracted position 34 is moved into a withdrawal zone 66, which is aligned with the reception zone 28 in the retraction direction 36 (see FIG. 6). The withdrawal zone 66 lies opposite of the access opening 62 with respect to the corresponding reception zone 28. Further, the withdrawal zone 66 may lie within the connector housing 6.

As can be seen in the sectional view of FIG. 6, each reception zone 28 may have a clear width 68 larger than a clear width 70 of the corresponding withdrawal zone 66, the clear widths 68, 70 being measured particularly to the retraction direction 36. On the other hand, the respective cover element 30 in the secured position 32 chiefly occupies the reception zone 28. In particular, the respective access opening 62 is closed by the corresponding cover element 30 in the secured position 32. For this, each cover element 30 may comprise a plate section 72, which blocks the corresponding access opening 62, when the cover element 30 is in the secured position 32.

In the secured position 32 of each cover element 30, the corresponding contact element 16 is positioned beyond the plate section 72 in the retraction direction 36. Thereby, a certain travel distance of the respective cover element 30 is necessary, until the respective contact element 16 is made accessible.

The cover structure 20 having each cover element 30 in the secured position 32 provides a finger protection for all contact elements 16 according to UL-Standard 60950 and DIN-EN-Standard 60592. The cover structure 20 having at least one cover element 30 in the retracted position 34 still provides at least a finger protection for all contact elements 16 according to DIN-EN-Standard 60592. This will be described in further detail below.

As can be seen in the sectional view of FIG. 5, each cover element 30 may comprise at least one blocking feature 74 for engaging with the at least one latch member 38 of the corresponding wall element 22. Preferably, each cover element 30 comprises for each latch member 38 at least one blocking feature 74. Each blocking feature 74 may be a nib-shaped protrusion 76 extending away from the plate section 72 perpendicularly to the retraction direction 36. Further, each blocking feature 74 may be aligned in the retraction direction 36 with one blocking surface 46 of the corresponding undeflected latch member 38. Thereby, each blocking feature 74 may abut in the retraction direction 36 against the corresponding undeflected latch member 38. This leads to the cover element 30 being maintained in its secured position 32.

If the at least one latch member 38 is deflected e.g., away from the corresponding cover element 30, the respective blocking surfaces 46 and blocking features 74 are brought out of alignment and thus do not abut against each other. This way, the corresponding cover element 30 is released and can be moved into the retracted position 34.

According to an alternative embodiment not shown in the figures, the at least one blocking feature may be a notch (not shown) extending through the plate section 72 perpendicularly to the retraction direction 36. Consequently, the at least one blocking surface 46 may be formed e.g., on a stopping protrusion (not shown) extending from the free end 44 of the corresponding latch member 38 and into the at least one blocking feature embodied by the notch. The remaining functionality may be analogous as described above.

As can be seen in FIG. 3, each contact element 16 may comprise at least one contact surface 92, which extends along the retraction direction 36. Further, the at least one contact surface 92 may border with the corresponding reception zone 28. In addition, the at least one contact surface 92 may be covered in a spaced apart manner by one wall section 24 of the corresponding wall element 22 in a direction perpendicular to the retraction direction 36. The at least one contact surface 92 may also be covered in the retraction direction 36 by the corresponding cover element 30 in the secured position 32. This prevents anything other than the mating contact 64 from accessing the corresponding contact element 16, as will be described in further detail below.

The tab-shaped contact elements 16 shown in the exemplary embodiment of FIG. 3 comprise two contact surfaces 92 on opposite sides of the contact element 16 facing outwards with respect to the contact element 16. In particular, each contact surface 92 faces the corresponding reception zone 28 and wall element 22, while being spaced apart from the corresponding wall element 22 by the reception zone 28. Thus, each contact surface 92 is accessible to the mating contact 64 (see FIG. 5) of the mating connector 2, which is inserted into the reception zone 28. Alternatively, the contact elements 16 may comprise inwardly facing contact surfaces (not shown).

The cover structure 20 may further comprise a cap element 78, preferably for each contact element 16. The cap element 78 covers at least a tip section 80 of the corresponding contact element 16. In particular, the cap element 78 comprises a top section 82 adjacent to the tip section 80 of the corresponding contact element 16. Said top section 82 covers the tip section 80 in the retraction direction 36. In other words, the top section 82 protects the tip section 80 against access from the retraction direction 36. For this, the top section 82 may be mechanically attached, glued, overmolded or otherwise fixed to the tip section 80.

The cap element 78 may further comprise at least one side section 84 extending along at least one side edge 86 of the corresponding contact element 16. As shown in FIG. 3, the cap element 78 may comprise two side sections 84 respectively extending in the retraction direction 36 along two opposite side edges 86 of the corresponding contact element 16. In particular, the top section 82 and the side sections 84 may be monolithically connected, hence allowing the cap element 78 to at least partly encircle the corresponding contact element 16.

The top section 82 of the cap element 78 may exhibit a material width 88 smaller than a material width 90 of the side sections 84 of the cap element 78, the material widths 88, 90 being measured in a direction perpendicular to the retraction direction 36. In particular, the material widths 88, 90 are measured in a direction perpendicular to the contact surfaces 92 of the corresponding contact element 16. Thus, in a cross-section perpendicular to the retraction direction 36, the cap element 78 may exhibit a double T-shaped profile.

The wall element 22 in combination with the cap element 78 forms a finger protection for the corresponding contact element 16. In particular, a finger protection according to DIN-EN-Standard 60592 is established thereby. In other words, a finger probe (not shown) having a dimension as defined in DIN-EN-Standard 60592 is hindered by the wall element 22 and/or the cap element 78 from reaching the contact surfaces 92 of the corresponding contact element 16.

In addition, the wall element 22, the cap element 78 and the cover element 30 in the secured position 32 also jointly form a finger protection for the corresponding contact element 16. In particular, a finger protection according to DIN-EN-Standard 60592 and UL-Standard 60950, respectively, is established thereby. In other words, neither the finger probe having the dimension as defined in DIN-EN-Standard 60592 nor a finger probe 104 having a dimension as defined in UL-Standard 60950 can reach the contact surfaces 92 of the corresponding contact element 16, due to being hindered therefrom by the wall element 22, the cap element 78 and/or the cover element 30 in the secured position 32. This is shown exemplarily in FIG. 1 with two finger probes 104 according to UL-Standard 60950 being prevented from entry into the reception zone 28, respectively, along the retraction direction 36 and perpendicularly to the retraction direction 36.

Each cover element 30 may comprise an orifice 94 for passing the corresponding contact element 16 and/or the corresponding cap element 78 therethrough. The orifice 94 may in particular be a slit 96 extending in the retraction direction 36. The slit 96 is preferably thin enough to prevent entry of any of the finger probes mentioned above. Furthermore, the orifice 94 embodied by the slit 96 may be shaped complementarily to the double T-shaped profile of the cap element 78, as shown in FIG. 2. The orifice 94 may extend through the plate section 72 of each cover element 30.

At least one guiding groove 98 extending along the retraction direction 36 may be formed on the at least one latch member 38. As is shown in FIG. 3, multiple guiding grooves 98 may be formed on each latch member 38. In particular, each guiding groove 98 may extend from the free end 44 towards the supported end 42 of the corresponding latch member 38 embodied by the cantilever flap 40. Optionally, the guiding grooves 98 may extend beyond the supported end 42 in the retraction direction 36 and through the wall element 22.

As can further be observed from FIG. 3, the guiding grooves 98 may be adapted to receive the blocking features 74 of the cover element 30. Further, the guiding grooves 98 may be adapted to receive the deflection elements 56 of the mating connector 2. In particular, each blocking feature 74 and each deflection element 56 may be received in a guiding groove 98.

For increased stability, the wall elements 22 may be monolithically connected to each other by a connecting wall 100 (see FIG. 2). Alternatively, the cover structure 20 may comprise one wall element 22 for all contact elements 16. Also alternatively, the cover structure 20 may comprise one cover element 30 for all contact elements 16.

FIG. 4 shows a sectional view of the mating connector 2 according to an exemplary embodiment of the present disclosure. The mating connector 2 may comprise a mating housing 102 with a female connector face **8*b* configured for receiving the male connector face 8*a* of the electrical connector 1. As described above, the mating connector 2 may further comprise the mating contact 64 (see FIG. 5). Preferably, the mating connector 2 comprises one mating contact 64 for each contact element 16 of the electrical connector 1. Each mating contact 64 may for example be a fork-shaped contact 106 configured for electrically contacting the corresponding tab-shaped contact 18 of the electrical connector 1. Each mating contact 64 may be soldered, crimped, welded and/or connected by any other conventional termination technique to a conductor (not shown) of an electrical cable (not shown) within the mating housing 102**.

As can further be seen in FIG. 4, the mating connector 2 may comprise a mating cover 108 arranged within the female connector face **8*b*. The mating cover 108 may comprise for each mating contact 64 a pillar-shaped contact guard 110 extending along the mating direction 14. Each contact guard 110 may surround the corresponding mating contact 64. Further, each contact guard 110 may be formed complementarily to the reception zones 28 of the electrical connector 1. In the shown exemplary embodiment, each contact guard 110 is cuboid and box-shaped. On a top surface 112, each contact guard 110 may have a slot 114, which is shaped complementarily to the cap element 78 of the electrical connector 1. Optionally, the shape of the slot 114 may be congruent with the shape of the orifices 94 of the cover element 30 of the electrical connector 1**.

FIG. 5 shows a detail of a sectional view of the connector assembly 4 comprising the electrical connector 1 and the mating connector 2. The connector assembly 4 is shown in a state of the mating process where the electrical connector 1 and the mating connector 2 are aligned along the mating direction 14. It is apparent that when the respective contact guard 110 is inserted into the corresponding reception zone 28 through the corresponding access opening 62, the corresponding contact element 16 and cap element 78 are passed through the slot 114. In particular, the contact surfaces 92 of the corresponding contact element 16 can be brought into electrical contact with the mating contact 64 within the respective contact guard 110.

For the respective contact guard 110 to be insertable into the corresponding reception zone 28, the cover element 30 being secured against movement in the secured position 32 has to be released. To achieve this, the mating connector 2 may further comprise the at least one deflection element 56 for deflecting the at least one latch member 38 of the electrical connector 1. The at least one deflection element 56 may be a hump-shaped or prismatic bulge 118 formed on the contact guard 110. Said bulge 118 may comprise the inverse surface 58 described above.

Prior to and/or during the insertion of the respective contact guard 110 into the corresponding reception zone 28, the inverse surface 58 and the bevel surface 52 of the at least one latch member 38 slide along each other. Since these surfaces 52, 58 extend obliquely with respect to the mating direction 14, the movement of the mating connector 2 along the mating direction 14 is transformed into a movement of the latch member 38 perpendicularly to the mating direction 14. In other words, the at least one latch member 38 is wedged aside by the corresponding deflection element 56, thus deflecting the respective latch member 38 away from the corresponding cover element 30. As already described above, such a deflection leads to the respective blocking surfaces 46 and blocking features 74 being brought out of alignment and out of abutment. Hence, the corresponding cover element 30 is released. Preferably, the cover element 30 can only be released this way.

Thereafter, the respective contact guard 110 abuts with its top surface 112 against the plate section 72 of the corresponding cover element 30. Thereby, the cover element 30 is pushed and moved from the secured position 32 to the retracted position 34 during the mating process.

Preferably, the at least one latch member 38 is only deflected, when the at least one deflection element 56 enters the corresponding reception zone 28 of the electrical connector 1. In other words, the at least one latch member 38 is only deflected, when the at least one deflection element 56 is in the access opening 62. As the at least one deflection element 56 is moved away from the access opening 62 and towards the withdrawal zone 66, the at least one deflection element 56 is received within one of the guiding grooves 98 formed on the corresponding latch member 38. In particular, the at least one deflection element 56 is entirely accommodated within the guiding groove 98 and thus does not mechanically interfere with the corresponding latch member 38.

Analogously, each blocking feature 74 embodied by the nib-shaped protrusions 76 is also received and entirely accommodated within one of the guiding grooves 98, so as to not mechanically interfere with the corresponding latch member 38.

If the electrical connector 1 and the mating connector 2 are unmated, in particular when the at least one deflection element 56 exits the reception zone 28 through the access opening 62, the deflection element 56 wedges the respective latch member 38 aside as was the case during the mating process. Further, when the electrical connector 1 and the mating connector 2 are unmated, all cover elements 30 preferably return from the retracted position 34 to the secured position 32, respectively. To achieve this, each cover element 30 may comprise at least one catch section 120 for interacting with a snap element 122 of the mating connector 2. For example, the at least one catch section 120 and snap element 122 may form a connection, such as a snap-fit connection, as can be seen in the sectional view of FIG. 6. The mating connector 2 may comprise multiple snap elements 122. Accordingly, each cover element 30 may comprise one catch section 120 for each snap element 122.

The snap elements 122 may be hook-shaped, knob-shaped or rib-shaped projections 124 formed on the mating connector 2 and pointing in the retraction direction 36. Further, the snap elements 122 may be received within the respective catch sections 120. In particular, each catch section 120 may be formed by a side wall 126 of the cover element 30 and a flexible cantilever beam 128 extending parallel to the side wall 126 along the retraction direction 36. The side wall 126 and/or the cantilever beam 128 may have a catching protrusion 130 extending towards the cantilever beam 128 and the side wall 126, respectively. Alternatively, the at least one catch section 120 may be formed by two flexible cantilever beams (not shown) extending parallel to each other. Further, alternatively, the allocations of the snap elements 122 and the catch sections 120 may be inverted between the electrical connector 1 and the mating connector 2.

Upon reception of the respective snap element 122 in the corresponding catch section 120, the snap-fit connection may be established. Said snap-fit connection allows the cover element 30 to closely follow a movement of the mating connector 2 along the retraction direction 36. In particular, the cover element 30 does not move into the retracted position 34 by its own gravity. In other words, the cover element 30 does not fall into the withdrawal zone 66 as long as the snap-fit connection with the mating connector 2 is in place. The cover element 30 only moves into the retracted position 34, when pushed by the mating connector 2, as described above.

Accordingly, the cover element 30 is pulled out of the withdrawal zone 66 and returned to the secured position 32 by the mating connector 2 via the snap-fit connection, when the mating connector 2 is moved against the retraction direction 36 e.g, during the un-mating process. Thereby, an occurrence of a gap between the mating connector 2 and the cover element 30 after the release of the cover element 30 from the secured position 32 is prevented at all times.

To ensure that the respective snap element 122 is not let go by the corresponding catch section 120, unless the cover element 30 is in the secured position 32, each catch section 120 may exhibit a higher rigidity when the cover element 30 is in the retracted position 34 than when the cover element 30 is in the secured position 32. This can be achieved as follows:

In the retracted position 34 of the cover element 30, the cantilever beam 128 is positioned within the withdrawal zone 66. In particular, the clear width 70 of the withdrawal zone 66 described above is such that the cantilever beam 128 rests against the wall element 22. Thus, the cantilever beam 128 is limited in its movement or entirely loses its flexibility. Thereby, the snap element 122 is firmly held within the catch section 120.

In this case, the terms "firmly held" refer to a state where a force required for pulling the snap element 122 out of the corresponding catch section 120 is larger than the weight force of the cover element 30 and/or the friction force acting between the cover element 30 and the rest of the electrical connector 1.

In the secured position 32 of the cover element 30, the cantilever beam 128 is positioned within the reception zone 28. Due to the larger clear width 68 of the reception zone 28 compared to the withdrawal zone 66, as described above, the cantilever beam 128 is spaced apart from the wall element 22 and thus maintains its flexibility. Consequently, the snap element 122 can easily enter or leave the catch section 120.

It is to be understood that the terms "easily enter or leave" refer to a state where the force required for inserting the snap element 122 into the corresponding catch section 120 as well as pulling the snap element 122 out of the corresponding catch section 120 is smaller than a resisting force acting between the cover element 30 and the rest of the electrical connector 1. Said resisting force may for example derive from the blocking features 74 and/or from hook-shaped anchoring latches 132 (see FIG. 1), which are formed on the cover element 30 and engage in a latching connection with the wall element 22.

Additionally or alternatively, a resilient position restoration element (not shown), such as a coil spring can be used to bias the cover element 30 towards the secured position 32 and out of the retracted position 34. Optionally, one of the electrical connector 1 and mating connector 2 may comprise a lever 134 for facilitating the mating process (see FIG. 4). Further, one of the electrical connector 1 and mating connector 2 may optionally comprise a sealing element 136, which is interposed between the electrical connector 1 and mating connector 2 in the mated condition (see FIGS. 5 and 6).

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:

at least one contact element; and a cover structure restricting access to the at least one contact element, including:

a wall element at least partially surrounding the at least one contact element and defining a reception zone between the wall element and the at least one contact element, the wall element including at least one deflectable latch member;

a cover element movable within the reception zone along a retraction direction from a secured position to a retracted position, the at least one contact element enclosed by the cover element in the secured position, the at least one deflectable latch member securing the cover element in the secured position; and a cap element separate from the cover element and fixed to at least an end section of the at least one contact element.

2. The electrical connector according to claim 1, wherein the at least one contact element comprises at least one contact surface extending along the retraction direction and bordering the reception zone.

3. The electrical connector according to claim 1, wherein the cover element comprises an orifice through which the at least one contact element passes.

4. The electrical connector according to claim 1, wherein at least one guiding groove extending in the retraction direction is formed on the at least one latch member.

5. The electrical connector according to claim 1, wherein the wall element comprises at least two latch members arranged opposite to each other with respect to the at least one contact element.

6. The electrical connector according to claim 1, wherein outer edges of the wall element define an access opening leading into the reception zone.

7. The electrical connector according to claim 6, wherein the cover element is movable between the secured position and the retracted position, the access opening is closed by the cover element in the secured position, and wherein the reception zone is accessible through the access opening when the cover element is in the retracted position.

8. The electrical connector according to claim 1, wherein the cover element comprises at least one blocking feature engaging with the at least one latch member.

9. The electrical connector according to claim 1, wherein the cover element comprises at least one catch section adapted to engage with a snap element of a mating connector.

10. The electrical connector according to claim 1, wherein the cover element is a single-piece component.

11. The electrical connector according to claim 1, further comprising a connector housing to which the wall element of the cover structure is monolithically connected.

12. A connector assembly, comprising:

an electrical connector, comprising:

at least one contact element; and a cover structure restricting access to the at least one contact element, including:

a wall element at least partially surrounding the at least one contact element and defining a reception zone between the wall element and the at least one contact element, the wall element including at least one deflectable latch member;

a cover element movable within the reception zone along a retraction direction from a secured position to a retracted position, the at least one contact element enclosed by the cover element in the secured position, the at least one deflectable latch member securing the cover element in the secured position; and a cap element separate from the cover element and fixed to at least an end section of the at least one contact element; and a mating connector electrically connecting to the electrical connector, comprising:

at least one mating contact electrically contacting the at least one contact element of the electrical connector when the mating connector is connected to the electrical connector;

at least one deflection element for deflecting the at least one latch member of the electrical connector.

13. The connector assembly according to claim 12, further comprising at least one snap element extending in the retraction direction and forming a connection with the electrical connector.

14. The connector assembly according to claim 12, wherein the at least one latch member of the electrical connector is deflected by the at least one deflection element of the mating connector when the at least one deflection element enters the reception zone.

15. A cover structure for an electrical connector, comprising:

a wall element including a deflectable latching member, the wall element sized to at least partially surrounding a contact element of the electrical connector and define a reception zone between the wall element and the contact element;

a cover element movable within the reception zone along a retraction direction from a secured position to a retracted position, the contact element enclosed by the cover element in the secured position, the at least one deflectable latch member securing the cover element in the secured position; and a cap element separate from the cover element and fixed to at least an end section of the at least one contact element.

16. The cover structure according to claim 15, wherein the cover element comprises an orifice through which the at least one contact element passes.

17. The cover structure according to claim 15, wherein a guiding groove extending in the retraction direction is formed on the latch member.

18. The cover structure according to claim 17, wherein the wall element comprises at least two latch members arranged opposite to each other.

* * * * *